: 2,778,811

Patented Jan. 22, 1957

2,778,811

CONDENSATION AND POLYMERISATION PRODUCTS OF ALDEHYDES WITH KETONE CYANOHYDRINS AND A METHOD OF MAKING SAME

Arthur Ullrich, Neckargemuend, Germany

No Drawing. Application August 20, 1952,
Serial No. 305,510

14 Claims. (Cl. 260—67)

This invention relates to new condensation and polymerisation products, and more particularly to condensation and polymerisation products of cyanohydrines of saturated or unsaturated ketones with saturated or unsaturated aliphatic aldehydes, and a method of making same.

Condensation and polymerisation products have found wide application in the plastics industry for various purposes. These products, depending upon their composition, possess often disadvantages which render them unsuitable for certain specific uses.

Aldehydes have, for instance, been condensed with a great number of compounds, the most important ones being phenol, urea and thiourea, aniline and other aromatic amines. In the place of aldehydes, ketones were also employed as such condensation reagents. Although these and other condensation and polymerisation products are extensively used in various technical fields and for various purposes, there is still a great demand for other condensation and polymerisation products with other valuable properties than those exhibited by the known products so that other technical products may be improved by their addition or new fields of application may be made accessible to the art.

It is one object of this invention to provide new and valuable resinous condensation and polymerisation products which, on acount of their specific composition and structure, are suitable for many diversified purposes and which in their wide applicability surpass other known condensation and polymerisation products.

Another object of this invention is to provide a simple and economical method of making such new valuable condensation and polymerisation products.

Other objects of this invention will become apparent from the specification and the examples given therein.

The new valuable resinous condensation and polymerisation products are obtained by reacting cyanohydrines of ketones with aldehydes in the presence of basic agents.

As cyanohydrines of ketones there are preferably used the cyanohydrines of the lower aliphatic saturated and unsaturated ketones, the more preferred ones being acetone, methyl ethyl ketone, methyl vinyl ketone and the like. Other ketones or mixtures thereof may, of course, also be employed.

As aldehydes there are preferably employed unsaturated aliphatic aldehydes, the most preferred one being croton aldehyde. But other saturated and unsaturated aliphatic aldehydes and mixtures thereof may be used likewise. Compounds capable of yielding aldehydes under the reaction conditions may also be employed.

Condensation and polymerisation is carried out in the presence of agents of basic reaction, such as sodium hydroxide, sodium carbonate, pyridine, piperidine, or organic amines, such as triethylamine. The amounts of said basic agents used as catalyst in this process are comparatively small. They should not exceed about 15% and are preferably between about 0.6% to 1.0% calculated for the amount of ketone cyanohydrine employed.

The reaction components are condensed and polymerized under ordinary or under increased pressure. Air may be excluded and the components may be reacted in the presence of an inert gas, such as nitrogen. Condensation and polymerisation may be carried out in the presence or absence of diluting agents, such as organic solvents, for instance, methanol. The reaction temperature is preferably between about 60° C. and about 80° C. and is usually increased to complete polymerisation. The basic agent may be neutralized before completing the polymerisation. In case it is a volatile base, it may be evaporated, preferably in a vacuum, with other volatile reaction components.

The following examples serve to illustrate this invention without, however, limiting the same thereto.

*Example 1.*—0.5 g. of sodium hydroxide and 75 g. of acetone cyanohydrine are dissolved in 200 cc. of methanol. 70 g. of croton-aldehyde are gradually added to said solution, while stirring, at about 60° C. and within one hour. Thereby the temperature increases to about 68° C. without supplying any external heat. The reaction mixture is then neutralized with dilute, 7–8% sulfuric acid and the volatile components and the solvent are distilled off by heating on the water bath until no more volatile distillate passes over. A very viscous resinous residue is obtained which is washed with water and is dried in a vacuum. Yield: 94.4 g.

*Example 2.*—100 g. of methyl ethyl ketone cyanohydrine are reacted with 140 g. of crotonaldehyde in the presence of 1 g. of triethylamine by adding said croton aldehyde, as described in Example 1, to the cyanohydrine at about 60–80° C. Heating of the reaction mixture is continued for 2 hours after all of the croton-aldehyde has been added. The non-reacted components are then distilled off in a vacuum by heating on a water bath. 160 g. of a lightly colored resin are obtained.

*Example 3.*—The equimolecular amount of methyl vinyl ketone cyanohydrine is used in the place of methyl ethyl ketone cyanohydrine and condensation and polymerisation are performed as described in Example 2.

*Example 4.*—Twice the equimolecular amount of acetaldehyde is used in the place of crotonaldehyde and condensation and polymerisation are performed as described in Example 2.

Depending upon the working conditions employed, the amount of basic agent added, the reaction temperature and duration, highly viscous oils or viscous or solid resins are obtained.

The new condensation and polymerisation products are excellent additives to natural and synthetic rubber. They are also very useful dispersing, gelatinizing, softening, and plasticizing agents for plastifiable material of all types, such as natural or synthetic resins, cellulose derivatives, chloroprene rubber, polymerisation products, such as polyvinyl compounds, for instance, polymerisation products of vinyl chloride which may be subjected to further chlorination, of vinyl acetate, mixed polymerisation products of vinyl chloride and vinyl acetate, of vinyl chloride and acrylic acid esters, polymerisates of vinyl alkyl ethers, vinyl alkyl thioethers, vinyl acetylene, divinyl acetylene, vinyl alkyl ketones, acrylic acid esters, methacrylic acid esters, styrene, butadiene, isoprene, isobutylene, and others more. They are further excellent raw materials for lacquers, valuable binding agents as such or raw materials for preparing such binding agents, impregnating agents, raw materials for protective coatings, and others more. They may also be used, in combination with cement, for the manufacture of insulating plates and the like, for producing roofing card board, plastic materials and others more.

The new condensation and polymerisation products are employed in the form of emulsions or in mixture with other oils and resins, or dissolved in suitable solvents whereby fillers and/or dyestuffs may be added.

Of course, many changes and variations in the reaction conditions, the reaction components, basic agents, and diluting agents, the reaction temperature and duration, the methods of working up, isolating and purifying the new condensation and polymerisation products, the manner in which they are used as such, as additives to, or in mixture with other plastic materials, or for the manufacture of various compositions of matter, and the like may be made by those skilled in the art in accordance with the principles set forth herein and in the claims annexed hereto.

Other ketone cyanohydrines than those mentioned in the specification and in the examples may also be used, such as cyanohydrines of methyl n-propyl ketone, hexanone-2, cyclohexanone, allyl methyl ketone, propenyl methyl ketone, ethylidene acetone, mesityloxide, monochloroacetone, and others.

Likewise other aldehydes than those mentioned in the specification and in the examples may be employed, such as formaldehyde, acetaldehyde, glyoxal, propionaldehyde, n-butyraldehyde, isobutyraldehyde, acroleine, furfural, benzaldehyde, aldol, n-valeraldehyde, isovaleraldehyde, methyl ethyl acetaldehyde, and others. As compounds which yield aldehydes under the reaction conditions there may be mentioned, for instance, trioxane, aldehyde bisulfite addition compounds, acetals and the like.

The proportions of ketone cyanohydrine to aldehyde in the reaction mixture may vary to a certain extent. An excess of the aldehyde over a proportion of 1 mol of the cyanohydrine to 1 mol of the aldehyde may be used, said excess serving as diluting agent and solvent and, thus, avoiding the addition of an indifferent solvent.

As indifferent solvent there may be employed, besides methanol mentioned in Example 1, other alcohols, such as ethanol, propanol, isopropanol, or higher alcohols, dioxane, ethylene glycol, propylene glycol and others more.

As basic agents or catalysts there may be used besides those mentioned in the specification and in the examples potassium carbonate, potassium hydroxide, sodium triphosphate, calcium oxide, ammonia, mono-, di-, and trimethylamine and other mono-, di-, and trialkanolamines, hydrazines, hydroxylamines, urea and alkyl ureas, alkylene diamines, such as ethylene diamine, hexamethylene tetramine, aromatic amines, such as aniline, toluidine, heterocyclic bases, such as pyrrolidine, imidazole, imidazoline, quinoline, and others more.

Under certain conditions (high temperature and heating for a long time) it is also possible to bring in reaction 1 mol of the cyanohydrine with 2 mols of the aldehyde. Preferably water will be excluded in the reaction.

I claim:

1. In a method of producing resinous condensation and polymerisation products, the steps comprising gradually adding, while stirring, crotonaldehyde to a solution of acetone cyanohydrine in methanol containing about 0.7% of sodium hydroxide calculated for the cyanohydrine used, at a temperature of about 60° C., neutralizing the sodium hydroxide, and heating the reaction mixture on the water bath to distill off any unreacted components, solvent and volatile products, and washing the resulting resinous condensation and polymerisation product, and drying the same.

2. In a method of producing resinous condensation and polymerisation products, the steps comprising gradually adding, while stirring, crotonaldehyde to methyl ethyl ketone cyanohydrine in the presence of about 1% of triethylamine calculated for the cyanohydrine used, at a temperature between about 60° C. and 80° C., continuing heating the reaction mixture at said temperature for 2 hours, and evaporating on a water bath in a vacuum any unreacted components and other volatile products whereby said condensation and polymerisation product remains.

3. In a process of producing resinous condensation and polymerization products, the step comprising heating, in the absence of water, a cyanohydrin of a ketone with an aliphatic aldehyde in the presence of a basic agent to a temperature between about 60° C. and about 80° C. for a period of time sufficient to inter-resinify said cyanohydrin with said aldehyde.

4. In a process according to claim 3, wherein the aliphatic aldehyde is an unsaturated aldehyde.

5. In a process according to claim 3, wherein the ketone cyanohydrin is a cyanohydrin of an aliphatic ketone.

6. In a process according to claim 3, wherein the aliphatic aldehyde is a mixture of aliphatic aldehydes.

7. In a process according to claim 3, wherein the aliphatic aldehyde is crotonaldehyde.

8. In a process according to claim 3, wherein the reaction is carried out under pressure.

9. In a process according to claim 3, wherein the reaction is carried out in the presence of an inert gas.

10. In a process of producing resinous condensation and polymerization products, the step comprising heating, in the absence of water, a cyanohydrin of a ketone with an aliphatic aldehyde in the presence of a basic agent and of a non-aqueous organic solvent to a temperature between about 60° C. and about 80° C. for a period of time sufficient to inter-resinify said cyanohydrin with said aldehyde.

11. As a new resinous composition, the condensation and polymerization product obtained on heating, in the absence of water, a cyanohydrin of a ketone with an aliphatic aldehyde in the presence of a basic agent to a temperature between about 60° C. and about 80° C. for a period of time sufficient to inter-resinify said cyanohydrin with said aldehyde.

12. As a new resinous composition, the condensation and polymerization product obtained on heating, in the absence of water, acetone cyanohydrin with crotonaldehyde in the presence of alkali hydroxide to a temperature between about 60° C. and about 80° C. for a period of time sufficient to inter-resinify said cyanohydrin with said aldehyde.

13. As a new resinous composition, the condensation and polymerization product obtained on heating, in the absence of water, methyl ethyl ketone cyanohydrin with crotonaldehyde in the presence of triethylamine to a temperature between about 60° C. and about 80° C. for a period of time sufficient to inter-resinify said cyanohydrin with said aldehyde.

14. As a new resinous composition, the condensation and polymerization product obtained on heating, in the absence of water, a cyanohydrin of a ketone with an unsaturated aliphatic aldehyde in the presence of a basic agent to a temperature between about 60° C. and about 80° C. for a period of time sufficient to inter-resinify said cyanohydrin with said aldehyde.

References Cited in the file of this patent

UNITED STATES PATENTS

| | | |
|---|---|---|
| 2,259,167 | Kung | Oct. 14, 1941 |
| 2,398,757 | Loder et al. | Apr. 16, 1946 |